(12) United States Patent
Chen et al.

(10) Patent No.: US 11,785,481 B2
(45) Date of Patent: Oct. 10, 2023

(54) ACCESS POINT DEVICE, METHOD, APPARATRUS AND MEDIUM

(71) Applicant: ARRIS Enterprises LLC, Suwanee, GA (US)

(72) Inventors: LiDan Chen, Shenzhen (CN); Li Wang, Shenzhen (CN); Hua Wen, Shenzhen (CN); Xiaojian Xia, Shenzhen (CN); Hong Zhou, Shenzhen (CN)

(73) Assignee: ARRIS ENTERPRISES LLC, Suwanee, GA (US)

(*) Notice: Subject to any disclaimer, the term of this patent is extended or adjusted under 35 U.S.C. 154(b) by 133 days.

(21) Appl. No.: 17/384,082

(22) Filed: Jul. 23, 2021

(65) Prior Publication Data

US 2022/0046434 A1 Feb. 10, 2022

(30) Foreign Application Priority Data

Aug. 7, 2020 (CN) .......................... 202010790735.4

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 24/08* (2013.01); *H04W 68/005* (2013.01); *H04W 88/08* (2013.01)

(58) Field of Classification Search
CPC ... H04W 24/02; H04W 24/08; H04W 68/005; H04W 88/08; H04W 76/19; H04W 84/12; H04W 76/25; H04B 17/318
See application file for complete search history.

(56) References Cited

U.S. PATENT DOCUMENTS

| 10,164,858 B2 | 12/2018 | Gunasekara et al. |
| 2009/0221288 A1* | 9/2009 | Zhang .................. H04B 7/2606 455/434 |

(Continued)

FOREIGN PATENT DOCUMENTS

| CN | 111343655 A | * 6/2020 | ............ H04W 24/02 |
| EP | 2 868 139 | 10/2019 | |

(Continued)

OTHER PUBLICATIONS

International Search Report and Written Opinion of the International Searching Authority dated Nov. 22, 2021, in International (PCT) Application No. PCT/US2021/042961.

(Continued)

*Primary Examiner* — Said M Elnoubi
(74) *Attorney, Agent, or Firm* — Wenderoth, Lind & Ponack, L.L.P.

(57) ABSTRACT

The present disclosure is related to an access point device, a method, an apparatus and a medium. The access point device comprises: a memory having instructions stored thereon; and a processor configured to execute the instructions stored on the memory to cause the access point device to perform the following: determining an unstable client device which is disconnected from the access point device repeatedly; determining a flap reason for the client device based on a disconnecting message between the access point device and the client device; and performing an operation corresponding to the flap reason to stop flapping.

20 Claims, 8 Drawing Sheets

(51) Int. Cl.
*H04W 24/08* (2009.01)
*H04W 68/00* (2009.01)
*H04W 88/08* (2009.01)

(56) References Cited

U.S. PATENT DOCUMENTS

2013/0151714 A1* 6/2013 Ralph .................. H04W 76/25
709/227
2013/0343370 A1 12/2013 Goto

FOREIGN PATENT DOCUMENTS

| EP | 2868139 B1 * | 10/2019 | ............ H04W 36/30 |
| JP | 2002077453 A * | 3/2002 | |
| WO | WO-2009012618 A1 * | 1/2009 | ............ H04L 5/0007 |
| WO | WO-2018040048 A1 * | 3/2018 | ......... H04L 41/0806 |

OTHER PUBLICATIONS

International Preliminary Report on Patentability dated Feb. 7, 2023 in International (PCT) Application No. PCT/US2021/042961.

* cited by examiner

ACCESS POINT DEVICE, METHOD, APPARATRUS AND MEDIUM

TECHNICAL FIELD

The present disclosure is related to an access point device, a method, an apparatus and a medium.

BACKGROUND

In existing Wi-Fi systems, a client device may encounter a connecting problem in Layer 2 Connectivity due to some reasons. Those reasons include improperly active disconnecting of an access point (AP) device, active disconnecting of the client device due to background scan, poor signals of the client device, and abnormality of the access point device (e.g., the access point device stops broadcast). When such a connecting problem arises, the client device may flap, i.e., the client device is disconnected from the access point device repeatedly.

SUMMARY

The present disclosure provides technical solutions which can find out reasons that cause the client device to flap and solve the flapping.

Aspects of the present disclosure are drawn to an access point device. The access point device comprises: a memory having instructions stored thereon; and a processor configured to execute the instructions stored on the memory to cause the access point device to perform the following: determining an unstable client device which is disconnected from the access point device repeatedly; determining a flap reason for the client device based on a disconnecting message between the access point device and the client device; and performing an operation corresponding to the flap reason to stop flapping.

In some embodiments, determining the unstable client device comprises: determining a flap number for the client device, the flap number indicating a number of time intervals between adjacent disconnections of the client device from the access point device shorter than a first predetermined period; and determining that the client device is the unstable client device if the flap number is greater than a flap threshold.

In some embodiments, the flap reason comprises one of active disconnecting by the access point device, background scanning by the client device, poor signals of the client device, and abnormality of the access point device.

In some embodiments, determining the flap reason for the client device based on the disconnecting message comprises: determining that the flap reason is active disconnecting by the access point device if the disconnecting message indicating that the client device is disconnected from the access point device by the access point device.

In some embodiments, if the flap reason is active disconnecting by the access point device, performing the operation corresponding to the flap reason to stop flapping comprises: determining a number of consecutive flap reasons being active disconnecting by the access point device; and stopping disconnecting the client device during a second predetermined period if the number of consecutive flap reasons being active disconnecting by the access point device is greater than an active disconnecting threshold.

In some embodiments, determining the flap reason for the client device based on the disconnecting message comprises: determining that the disconnecting message indicates that the client device is disconnected from the access point device by the client device; determining that uplink receiving signal strength at the access point device is greater than a receiving signal strength threshold for disconnecting; and determining that the flap reason is background scanning by the client device if the client device is not an extender, and determining that the flap reason is abnormality of the access point device if the client device is the extender.

In some embodiments, if the flap reason is background scanning by the client device, performing the operation corresponding to the flap reason to stop flapping comprises: stopping steering the client device during a third predetermined period.

In some embodiments, determining the flap reason for the client device based on the disconnecting message comprises: determining that the disconnecting message indicates that the client device is disconnected from the access point device by the client device; determining that uplink receiving signal strength at the access point device is smaller than a receiving signal strength threshold for disconnecting; and determining that the flap reason is poor signals of the client device.

In some embodiments, if the flap reason is poor signals of the client device, performing the operation corresponding to the flap reason to stop flapping comprises: if the client device is an extender, sending a notification of poor signals of the extender.

In some embodiments, if the flap reason is poor signals of the client device, performing the operation corresponding to the flap reason to stop flapping comprises: if the client device is not an extender, increasing transmitting power of the access point device or moving the client device to a channel with a better signal.

In some embodiments, determining the flap reason for the client device based on the disconnecting message comprises: determining that the disconnecting message indicates that the client device is disconnected from the access point device by the client device; determining that all client devices connected to the access point device are disconnected; and determining that the flap reason is abnormality of the access point device.

In some embodiments, if the flap reason is abnormality of the access point device, performing the operation corresponding to the flap reason to stop flapping comprises: restarting the access point device.

In some embodiments, the processor further executes the instructions to cause the access point device to perform the following: sending the flap reason to a cloud.

Other aspects of the present disclosure are drawn to a method performed by an access point device. The method comprises: determining an unstable client device which is disconnected from the access point device repeatedly; determining a flap reason for the client device based on a disconnecting message between the access point device and the client device; and performing an operation corresponding to the flap reason to stop flapping.

Other aspects of the present disclosure are drawn to a non-transitory computer-readable medium with instructions stored thereon which when executed by a processor of an access point device cause the processor to perform the following: determining an unstable client device which is disconnected from the access point device repeatedly; determining a flap reason for the client device based on a disconnecting message between the access point device and the client device; and performing an operation corresponding to the flap reason to stop flapping.

Other aspects of the present disclosure are drawn to an apparatus for wireless communication comprising means for performing any of the method of the present disclosure.

BRIEF DESCRIPTION OF THE DRAWINGS

To better understand the present disclosure and to show how to implement the present disclosure, reference will now be made, by way of example, to the accompanying drawings, in which.

Note that like reference numerals refer to corresponding parts throughout the drawings. Moreover, multiple instances of the same part are designated by a common prefix separated from an instance number by a dash.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
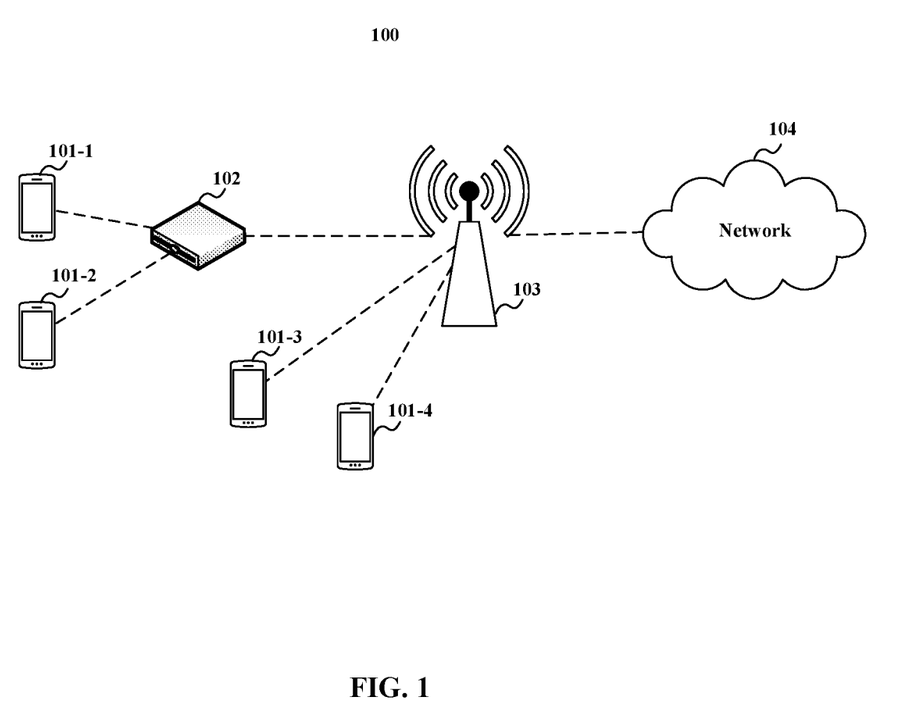
FIG. 1 illustrates a Wi-Fi system according to embodiments of the present disclosure.

FIG. 1 illustrates a Wi-Fi system 100 according to embodiments of the present disclosure. The Wi-Fi system 100 comprises one or more client devices 101, an extender 102, an access point device 103 and a network 104 (e.g., LAN, WAN, etc.). The one or more client devices 101 may include, but are not limited to, personal computers, laptop computers, cell phone, Internet of Things (IoT) devices, etc. The access point device 103 may wirelessly communicate with the one or more client devices 101 directly or via the extender 102 using wireless communication that is compatible with an IEEE 802.11 standard. Thus, the wireless communication may occur in, e.g., a 2.4 GHz, a 5 GHz, a 6 GHz and/or a 60 GHz frequency band. (Note that IEEE 802. Had communication over a 60 GHz frequency band is sometimes referred to as 'WiGig.' In the present discussion, these embodiments also encompassed by Wi-Fi. However, a wide variety of frequency bands may be used. The access point device 103 may provide access to network 104 (e.g., via an Ethernet protocol), and may be a stand-alone access point device, may be included with a router and/or modem as a gateway device, or may be implemented on a client device.

Figure 2:
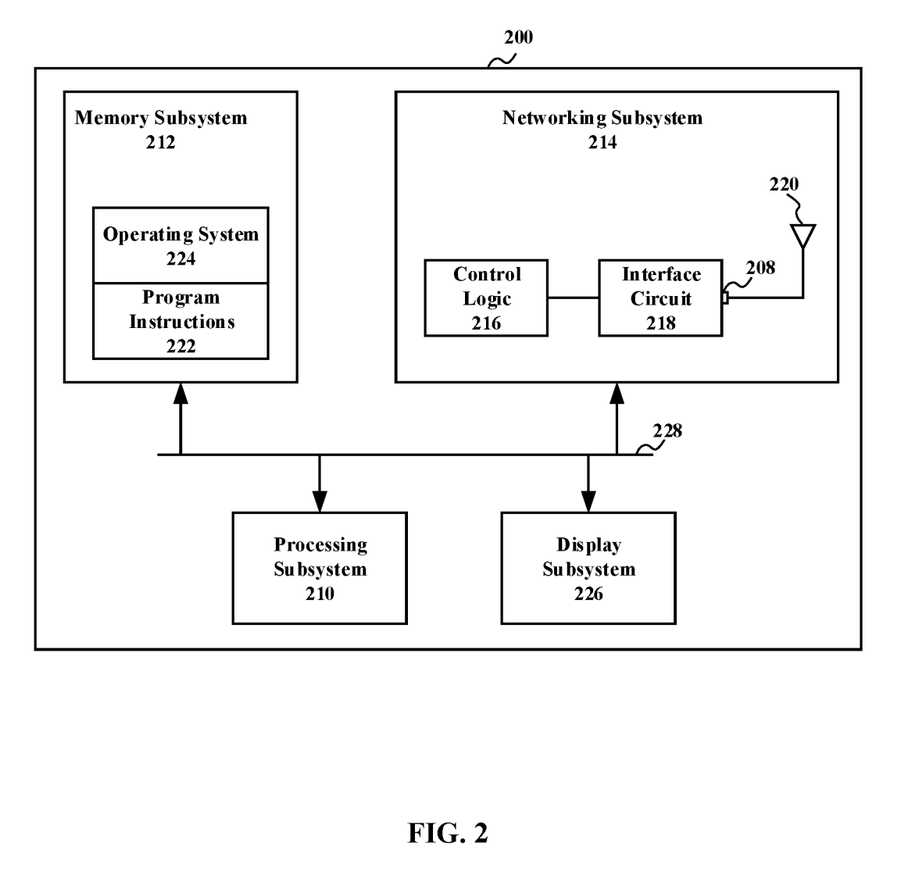
FIG. 2 illustrates a block diagram of an example of an access point device according to embodiments of the present disclosure.

FIG. 2 illustrates a block diagram of an example of an access point device 200 according to embodiments of the present disclosure. Access point device 103 and/or extender 102 may be implemented according to the structure of access point device 200. This access point device 200 includes processing subsystem 210, memory subsystem 212, and networking subsystem 214. Processing subsystem 210 includes one or more devices configured to perform computational operations. For example, processing subsystem 210 can include one or more microprocessors, ASICs, microcontrollers, programmable-logic devices, graphical processor units (GPUs) and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), and/or other types of memory (which collectively or individually are sometimes referred to as a 'computer-readable storage medium'). In some embodiments, instructions for processing subsystem 210 in memory subsystem 212 include: one or more program modules or sets of instructions (such as program instructions 222 or operating system 224), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in access point device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by access point device 200 as fast-access storage for often-used data, while the mass-storage device is used to store less frequently used data.

Networking subsystem 214 includes one or more devices configured to couple to and communicate on a wired and/or wireless network (i.e., to perform network operations), including: control logic 216, an interface circuit 218 and one or more antennas 220 (or antenna elements). (While FIG. 2 includes one or more antennas 220, in some embodiments access point device 200 includes one or more nodes, such as nodes 208, e.g., a pad, which can be coupled to the one or more antennas 220. Thus, access point device 200 may or may not include the one or more antennas 220.) For example, networking subsystem 214 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, Wide Area Network interface circuitry, interface circuitry for connection to the Internet, e.g., via an Internet Service Provider (ISP) or via Multiple Systems Operator (MSO) equipment, and/or another networking system.

Networking subsystem 214 includes hardware processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system.

Within access point device 200, processing subsystem 210, memory subsystem 212, and networking subsystem 214 are coupled together using bus 228. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections among the subsystems.

In some embodiments, access point device 200 includes a display subsystem 226 for displaying information on a display, which may include a display driver and the display, such as a liquid-crystal display, a multi-touch touchscreen, etc.

Access point device 200 can be (or can be included in) any electronic device with at least one network interface. For example, access point device 200 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, an access point, test equipment, a gateway device, a set-top-box, a smart media device, and/or another electronic device.

Although specific components are used to describe access point device 200, in alternative embodiments, different components and/or subsystems may be present in access point device 200. For example, access point device 200 may include one or more additional processing subsystems, memory subsystems, networking subsystems, and/or display subsystems. Additionally, one or more of the subsystems may not be present in access point device 200. Moreover, in some embodiments, access point device 200 may include one or more additional subsystems that are not shown in FIG. 2. Also, although separate subsystems are shown in FIG. 2, in some embodiments some or all of a given subsystem or component can be integrated into one or more of the other subsystems or component(s) in access point device 200. For example, in some embodiments program instructions 222 are included in operating system 224 and/or control logic 216 is included in interface circuit 218.

While the discussions herein refer to Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 222, operating system 224 (such as a driver for interface circuit 218) or in firmware in interface circuit 218. Alternatively or additionally, at least some of the operations in the communication techniques may be implemented in a physical layer, such as hardware in interface circuit 218.

Figure 3:
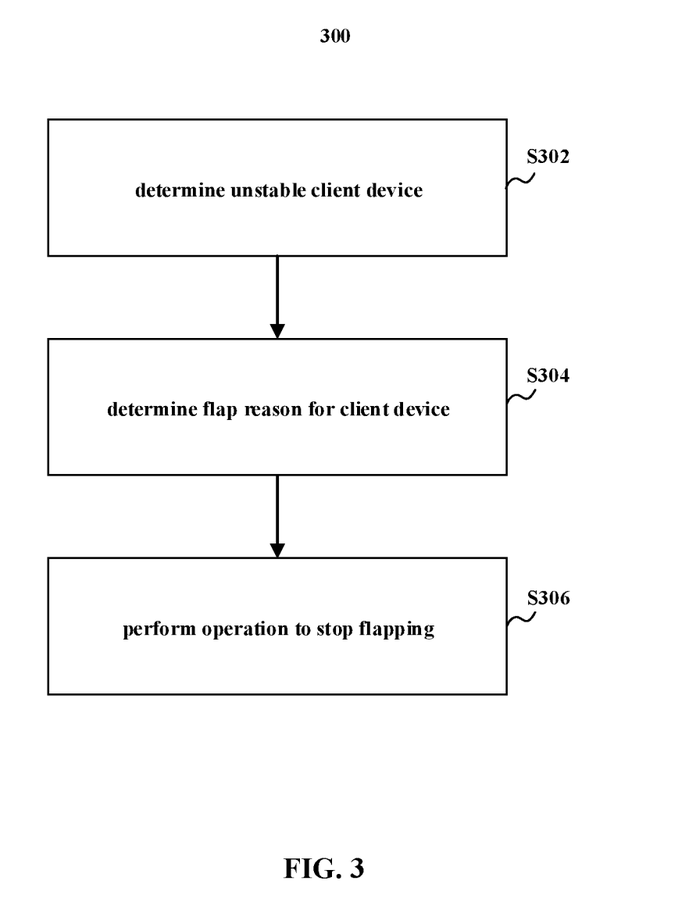
FIG. 3 illustrates a method performed by an access point device according to embodiments of the present disclosure.

FIG. 3 illustrates a method 300 performed by an access point device according to embodiments of the present disclosure. At step S302, the access point device determines an unstable client device. The unstable client device is disconnected from the access point device repeatedly. At step S304, the access point device determines a flap reason for the client device based on a disconnecting message between the access point device and the client device. The flap reason may comprise one of active disconnecting by the access point device (type I), background scanning by the client device (type II), poor signals of the client device (type III), and abnormality of the access point device (type IV). At step S306, the access point device performs an operation, corresponding to the flap reason, to stop flapping. If the flap reason is active disconnecting by the access point device (type I), measures need to be taken to stop the access client device from disconnecting the client device actively. If the flap reason is background scanning by the client device (type II), which indicates that the client device prefers to connect to a certain channel, and measures need to be taken to stop the access point device from steering the client device. If the flap reason is poor signals of the client device (type III), measures need to be taken to improve signal quality for the client device. If the flap reason is abnormality of the access point device (type IV), the access point device needs to be restarted to recover the connection.

Moreover, the access point device further records the flap reason for the client device in MIB, TR69 or App, or sends the flap reason for the client device to a cloud for further analysis or optimization. Specific implement of the method 300 will be described with reference to FIGS. 4 to 8 hereinafter.

Figure 4:
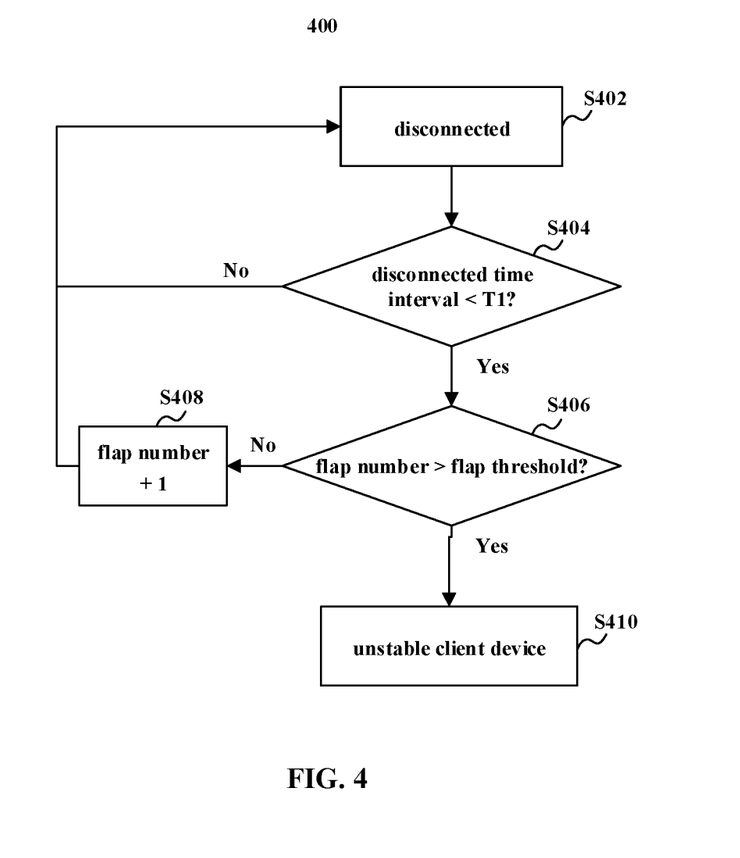
FIG. 4 illustrates a process for determining an unstable client device according to embodiments of the present disclosure.

FIG. 4 illustrates a process 400 for determining an unstable client device according to embodiments of the present disclosure.

At step S402, an access point device determines a client device is disconnected. At step S404, the access point device determines whether a time interval between adjacent disconnections of the client device from the access point device is shorter than a first predetermined period T1. The first predetermined period T1 can be defined by a manager to specify a minimum time interval allowed for adjacent disconnections. If the time interval between adjacent disconnections of the client device from the access point device is shorter than the first predetermined period T1, the client device is considered as flapping, and the process 400 proceeds to step S406. Otherwise, the process 400 returns to step S402. At step S406, the access point device determines whether a flap number for the client device is greater than a flap threshold. The flap threshold is a flap number required to regard the client device as the unstable client device. If the flap number for the client device is greater than the flap threshold, the process 400 proceeds to step S410. At step S410, the client device is determined as the unstable client device. Otherwise, the process 400 proceeds to step S408. At step S408, the flap number for the client device is increased by 1.

Figure 5:
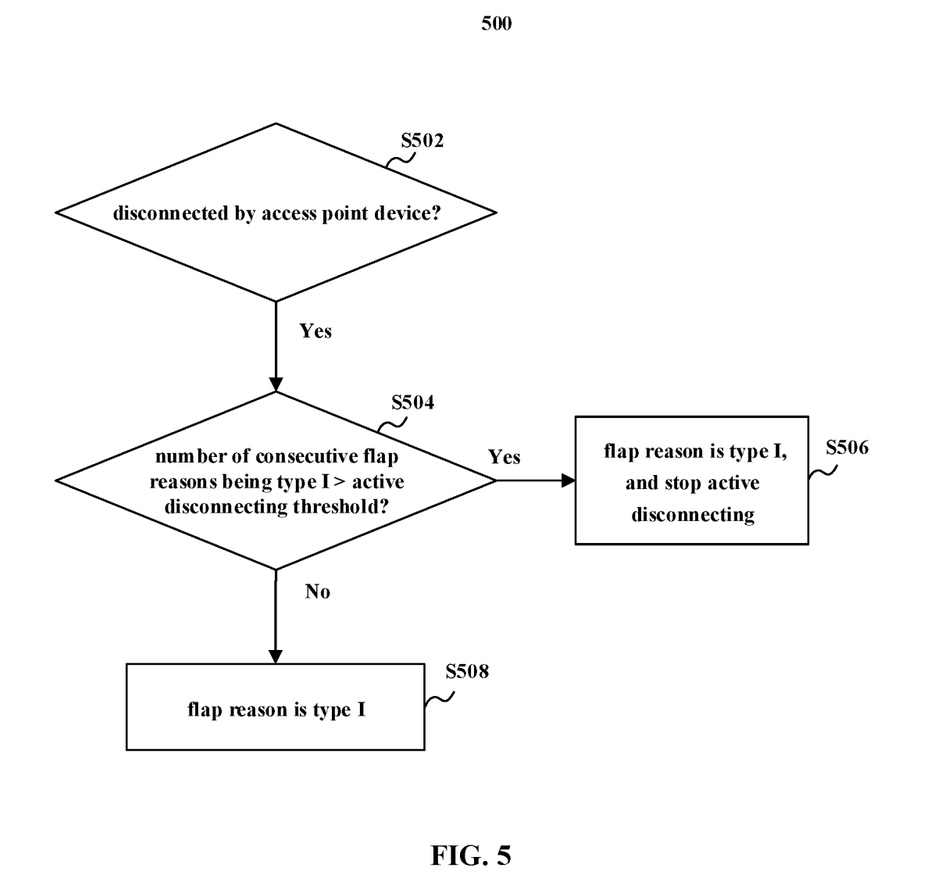
FIG. 5 illustrates a process for stopping flapping of a client device if the client device is disconnected from an access point device by the access point device according to embodiments of the present disclosure.

FIG. 5 illustrates a process 500 for stopping flapping of a client device if the client device is disconnected from an access point device by the access point device according to embodiments of the present disclosure.

At step S502, the access point device determines whether the client device is disconnected from the access point device by the access point device, based on a disconnecting message between the access point device and the client device. In some embodiments of the present disclosure, if the client device is disconnected from the access point device by the access point device, the access point device can determine the flap reason is active disconnecting by the access point device (type I) immediately after step S502, and then performs the following steps S504 to S508 to perform an operation to stop flapping.

In some embodiments of the present disclosure, if the client device is disconnected from the access point device by the access point device, the process 500 proceeds to step S504. At step S504, the access point device determines whether a number of consecutive flap reasons being active disconnecting by the access point device is greater than an active disconnecting threshold. The active disconnecting threshold specifies a maximum number that the access point device can disconnect the client device actively. If the number of consecutive flap reasons being active disconnecting by the access point device is greater than the active disconnecting threshold, the process proceeds to step S506. At step S506, the access point device determines the flap reason is active disconnecting by the access point device (type I), and stops disconnecting the client device actively during a second predetermined period T2. The second predetermined period T2 is a predetermined period during which the access point device is prevented from disconnecting the client device actively. Otherwise, the process 500 proceeds to step S508. At step S508, the access point device determines the flap reason is active disconnecting by the access point device (type I) only.

Figure 6:
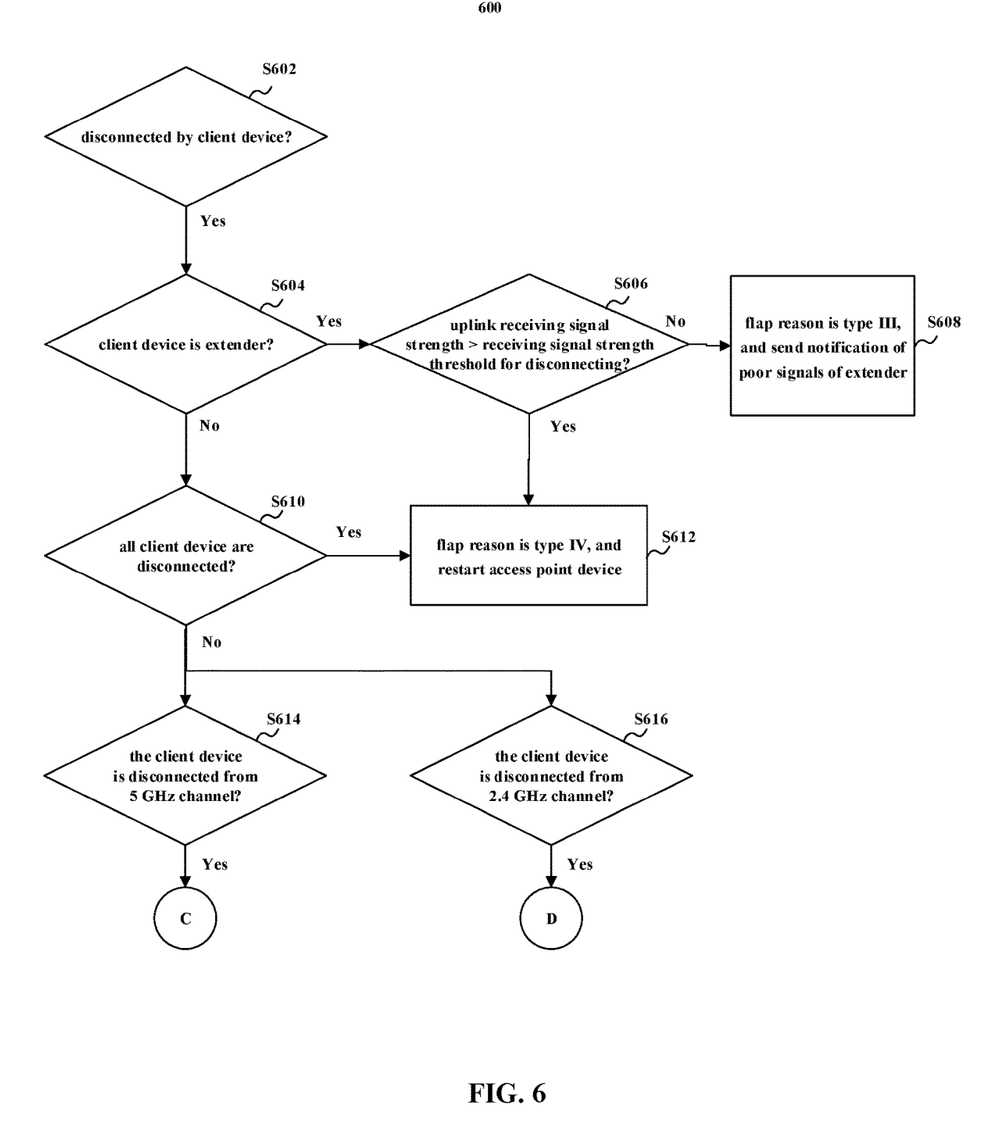
FIG. 6 illustrates a process for stopping flapping of a client device if the client device is disconnected from an access point device by the client device according to embodiments of the present disclosure.

FIG. 6 illustrates a process 600 for stopping flapping of a client device if the client device is disconnected from an access point device by the client device according to embodiments of the present disclosure.

At step S602, the access point device determines whether the client device is disconnected from the access point device by the client device, based on a disconnecting message between the access point device and the client device. If the client device is disconnected from the access point device by the client device, the process 600 proceeds to step S604. At step S604, the access point device determines whether the client device is an extender.

If it is determined that the client device is the extender, the process 600 proceeds to step S606. At step S606, the access point device determines whether uplink receiving signal strength (e.g., uplink RSSI) at the access point device is greater than a receiving signal strength threshold for disconnecting (e.g., RSSI threshold for disconnecting). As discussed herein, the uplink receiving signal strength at the access point device means strength of a signal received by the access point device from the client device. The receiving signal strength threshold for disconnecting is receiving signal strength that triggers the client device to disconnect. If the uplink receiving signal strength at the access point device is greater than the receiving signal strength threshold for disconnecting, the process proceeds to step S612. At step S612, the access point device determines the flap reason is abnormality of the access point device (type IV), and restarts the access point device. By restarting the access point device, the access point device can self-recover in case of abnormality of the access point device.

If the uplink receiving signal strength at the access point device is not greater than the receiving signal strength threshold for disconnecting, the process proceeds to step S608. At step S608, the access point device determines the flap reason is poor signals of the client device (type III), and sends a notification of poor signals of the extender. The notification can be sent to a cloud or a controller of the access point device or can be displayed on a display of the access point device, to notify a manager of the extender that signals received by the access point device from the extender are poor. The manager of the extender can adjust a position of the extender or repair the extender to improve signal quality of the extender.

If it is determined that the client device is not the extender, the process 600 proceeds to step S610. At step S610, the access point device determines whether all client devices are disconnected. If all client devices are disconnected, the process 600 proceeds to step S612. At step S612, the access point device determines that the flap reason is abnormality of the access point device (type IV), and restarts the access point device. By restarting the access point device, the access point device can self-recover in case of abnormality of the access point device.

Figure 7:
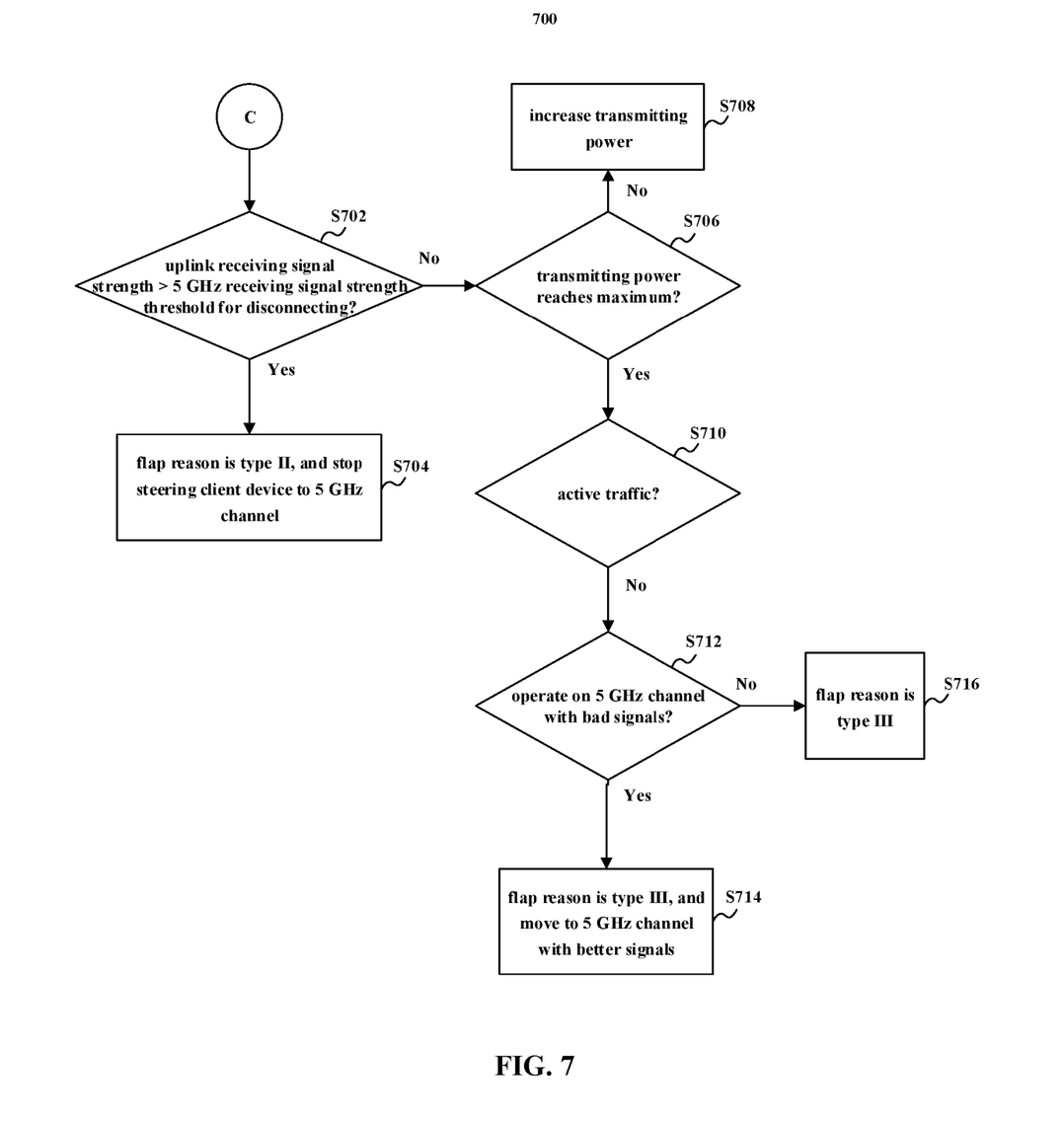
FIG. 7 illustrates a process for stopping flapping of a client device if the client device is disconnected from a 5 GHz channel of an access point device according to embodiments of the present disclosure.
Figure 8:
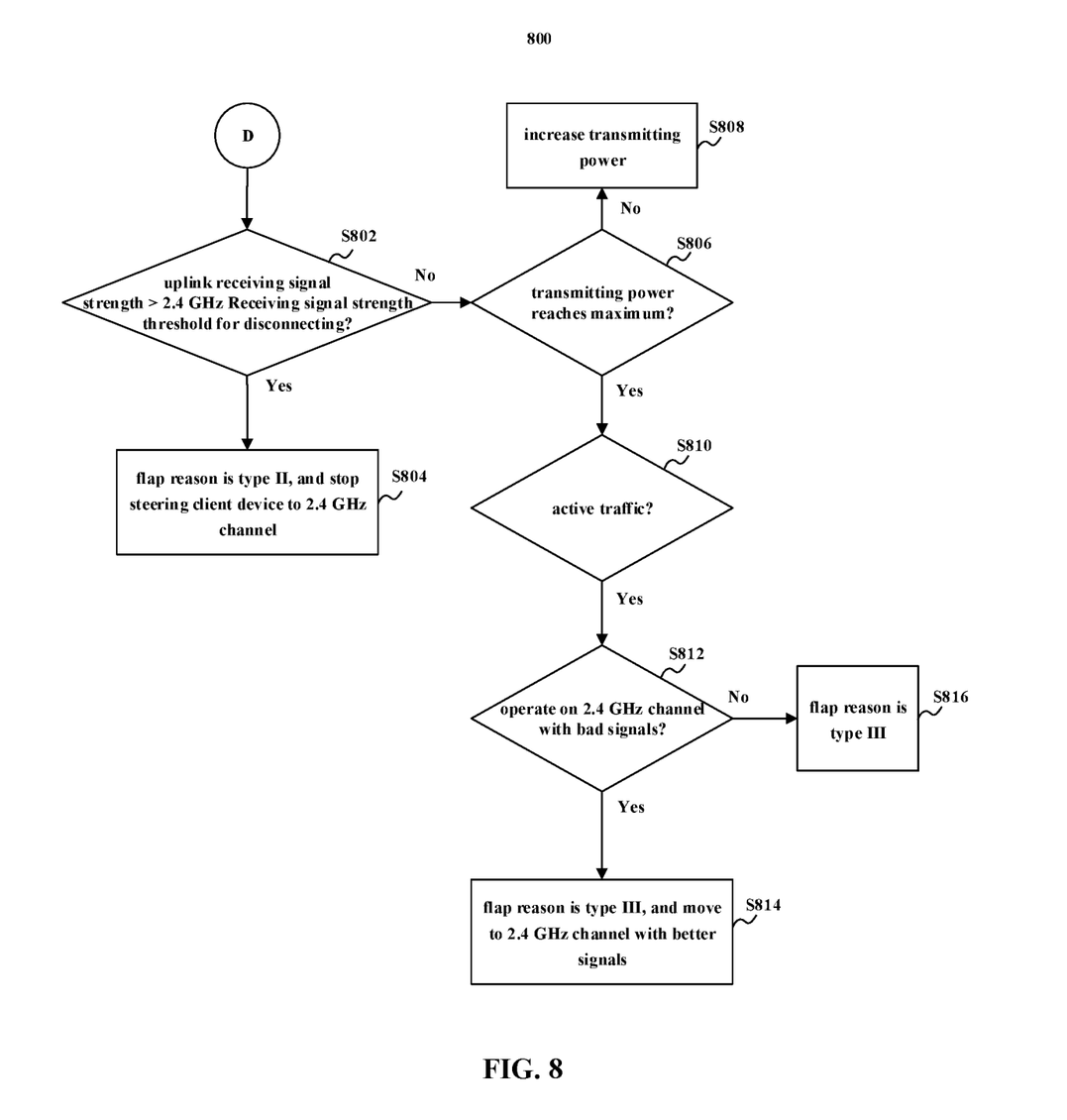
FIG. 8 illustrates a process for stopping flapping of a client device if the client device is disconnected from a 2.4 GHz channel of an access point device according to embodiments of the present disclosure.

If not all client devices are disconnected, the process 600 proceeds to step S614 and step S616. At step S614, the access point device determines whether the client device is disconnected from a 5 GHz channel. If the client device is disconnected from the 5 GHz channel, the process 600 proceeds to C, and then enters the process as illustrated in FIG. 7. At step S616, the access point device determines whether the client device is disconnected from a 2.4 GHz channel. if the client device is disconnected from the 2.4 GHz channel, the process 600 proceeds to D, and then enters the process as illustrated in FIG. 8.

FIG. 7 illustrates a process 700 for stopping flapping of a client device if the client device is disconnected from a 5 GHz channel of an access point device according to embodiments of the present disclosure. At step S702, the access point device determines whether uplink receiving signal strength (e.g., uplink RSSI) at the access point device is greater than a 5 GHz receiving signal strength threshold for disconnecting (e.g., 5 GHz RSSI threshold for disconnecting). If the uplink receiving signal strength at the access point device is greater than the 5 GHz receiving signal strength threshold for disconnecting, the process 700 proceeds to step S704. At step S704, the access point device determines that the flap reason is background scanning by the client device (type II), and stops steering the client device to a 5 GHz channel during a third predetermined period T3.

In some embodiments of the present disclosure, if it is determined at step S702 that the uplink receiving signal strength at the access point device is not greater than the 5 GHz receiving signal strength threshold for disconnecting, it can be determined immediately after step S702 that the flap reason is poor signals of the client device (type III), and then the following steps S706 to S714 are performed to perform an operation to stop flapping.

In some embodiments of the present disclosure, if it is determined at step S702 that the uplink receiving signal strength at the access point device is not greater than the 5 GHz receiving signal strength threshold for disconnecting, the process 700 proceeds to step S706. At step S706, the access point device determines whether its transmitting power reaches a maximum transmitting power. If the access point device's transmitting power does not reach the maximum transmitting power, the process 700 proceeds to step S708. At step S708, the access point device increases its transmitting power to improve signal quality of the client device. If the access point device's transmitting power reaches the maximum transmitting power, the process 700 proceeds to step S710.

At step S710, the access point device determines whether there is active traffic (i.e., ongoing traffic) at the access point device currently. If there is no active traffic at the access point device currently, the process proceeds to step S712. In this way, the active traffic at the access point device can be protected from the following operation to stop flapping.

At step S712, the access point device determines whether it is operating on a 5 GHz channel with bad signals, e.g., a 5 GHz low power signal. If the access point device is operating on the 5 GHz channel with bad signals, the process 700 proceeds to step S714. At step S714, the access point device determines that the flap reason is poor signals of the client device (type III), and moves to a 5 GHz channel with better signals, e.g., a 5 GHz high power signal. If the access point device is not operating on the 5 GHz channel with bad signals, the process 700 proceeds to step S716. At step S716, the access point device determines that the flap reason is poor signals of the client device (type III) only.

FIG. 8 illustrates a process 800 for stopping flapping of a client device if the client device is disconnected from a 2.4 GHz channel of an access point device according to embodiments of the present disclosure. At step S802, the access point device determines whether uplink receiving signal strength (e.g., uplink RSSI) at the access point device is greater than a 2.4 GHz receiving signal strength threshold for disconnecting (e.g., 2.4 GHz RSSI threshold for disconnecting). If the uplink receiving signal strength at the access point device is greater than the 2.4 GHz receiving signal strength threshold for disconnecting, the process 800 proceeds to step S804. At step S804, the access point device determines that the flap reason is background scanning by the client device (type II), and stops steering the client device to a 2.4 GHz channel during a third predetermined period T3.

In some embodiments of the present disclosure, if it is determined at step S802 that the uplink receiving signal strength at the access point device is not greater than the 2.4 GHz receiving signal strength threshold for disconnecting, it can be determined immediately after step S802 that the flap reason is poor signals of the client device (type III), and then the following steps S806 to S814 are performed to perform an operation to stop flapping.

In some embodiments of the present disclosure, if it is determined at step S802 that the uplink receiving signal strength at the access point device is not greater than the 2.4 GHz receiving signal strength threshold for disconnecting, the process 800 proceeds to step S806. At step S806, the access point device determines whether its transmitting power reaches a maximum transmitting power. If the access point device's transmitting power does not reach the maximum transmitting power, the process 800 proceeds to step S808. At step S808, the access point device increases its transmitting power to improve signal quality of the client device. If the access point device's transmitting power reaches the maximum transmitting power, the process 700 proceeds to step S810.

At step S810, the access point device determines whether there is active traffic (i.e., ongoing traffic) at the access point device currently. If there is no active traffic at the access point device currently, the process proceeds to step S812. In this way, the active traffic at the access point device can be protected from the following operation to stop flapping.

At step S812, the access point device determines whether it is operating on a 2.4 GHz channel with bad signals, e.g., a 2.4 GHz edge channel. If the access point device is operating on the 2.4 GHz channel with bad signals, the process 800 proceeds to step S814. At step S814, the access point device determines that the flap reason is poor signals of the client device (type III), and moves to a 2.4 GHz channel with better signals, e.g., channel 6 of 2.4 GHz. If the access point device is not operating on the 2.4 GHz channel with bad signals, the process 800 proceeds to step S816. At step S816, the access point device determines that the flap reason is poor signals of the client device (type III).

The process 700 in FIG. 7 and the process 800 in FIG. 8 can avoid ping-pong effect (i.e., toggling among 2.4 GHz, 5 GHz or other channels) of the client device in some degree, such that the connection between the client device and the access point device becomes more stable. Moreover, the process 700 in FIG. 7 and the process 800 in FIG. 8 enables the access point device to move to a channel with better signals to make the connection between the client device and the access point device become more stable, without influencing the active traffic of the access point device.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

What we claim is:

1. An access point device in a wireless fidelity (Wi-Fi) network, comprising:
    a memory having instructions stored thereon; and
    a processor configured to execute the instructions stored on the memory to cause the access point device to perform the following:
        determining that a client device in the Wi-Fi network is an unstable client device based on repeated disconnection from the access point device;
        determining a flap reason for the client device based on a disconnecting message between the access point device and the client device;
        determining that the flap reason is background scanning by the client device if the client device is not an extender, and determining that the flap reason is abnormality of the access point device if the client device is the extender; and
        performing an operation corresponding to the flap reason to stop flapping.

2. The access point device according to claim 1, wherein determining the unstable client device comprises:
    determining a flap number for the client device, the flap number indicating a number of time intervals between adjacent disconnections of the client device from the access point device shorter than a first predetermined period; and
    determining that the client device is the unstable client device if the flap number is greater than a flap threshold.

3. The access point device according to claim 1, wherein the flap reason comprises one of active disconnecting by the access point device, background scanning by the client device, poor signals of the client device, and abnormality of the access point device.

4. The access point device according to claim 1, wherein determining the flap reason for the client device based on the disconnecting message comprises:
    determining that the flap reason is active disconnecting by the access point device if the disconnecting message indicating that the client device is disconnected from the access point device by the access point device.

5. The access point device according to claim 1, wherein, if the flap reason is active disconnecting by the access point device, performing the operation corresponding to the flap reason to stop flapping comprises:
    determining a number of consecutive flap reasons being active disconnecting by the access point device; and
    stopping disconnecting the client device during a second predetermined period if the number of consecutive flap reasons being active disconnecting by the access point device is greater than an active disconnecting threshold.

6. The access point device according to claim 1, wherein determining the flap reason for the client device based on the disconnecting message comprises:
    determining, when the client device is not the extender, that the disconnecting message indicates that the client device is disconnected from the access point device by the client device; and
    determining, when the client device is the extender, that uplink receiving signal strength at the access point device is greater than a receiving signal strength threshold for disconnecting.

7. The access point device according to claim 1, wherein, if the flap reason is background scanning by the client device, performing the operation corresponding to the flap reason to stop flapping comprises:
    stopping steering the client device during a third predetermined period.

8. The access point device according to claim 1, wherein determining the flap reason for the client device based on the disconnecting message comprises:
    determining that the disconnecting message indicates that the client device is disconnected from the access point device by the client device;
    determining that uplink receiving signal strength at the access point device is smaller than a receiving signal strength threshold for disconnecting; and
    determining that the flap reason is poor signals of the client device.

9. The access point device according to claim 1, wherein, if the flap reason is poor signals of the client device, performing the operation corresponding to the flap reason to stop flapping comprises:
    if the client device is an extender, sending a notification of poor signals of the extender.

10. The access point device according to claim 1, wherein, if the flap reason is poor signals of the client device, performing the operation corresponding to the flap reason to stop flapping comprises:
   if the client device is not an extender, increasing transmitting power of the access point device or moving the client device to a channel with a better signal.

11. The access point device according to claim 1, wherein determining the flap reason for the client device based on the disconnecting message comprises:
   determining that the disconnecting message indicates that the client device is disconnected from the access point device by the client device;
   determining that all client devices connected to the access point device are disconnected; and
   determining that the flap reason is abnormality of the access point device.

12. The access point device according to claim 1, wherein, if the flap reason is abnormality of the access point device, performing the operation corresponding to the flap reason to stop flapping comprises:
   restarting the access point device.

13. The access point device according to claim 1, wherein, the processor further executes the instructions to cause the access point device to perform the following:
   sending the flap reason to a cloud.

14. A method performed by an access point device in a wireless fidelity (Wi-Fi) network, the method comprising:
   determining that a client device in the Wi-Fi network is an unstable client device based on repeated disconnection from the access point device;
   determining a flap reason for the client device based on a disconnecting message between the access point device and the client device;
   determining that the flap reason is background scanning by the client device if the client device is not an extender, and determining that the flap reason is abnormality of the access point device if the client device is the extender; and
   performing an operation corresponding to the flap reason to stop flapping.

15. The method according to claim 14, wherein determining the unstable client device comprises:
   determining a flap number for the client device, the flap number indicating a number of time intervals between adjacent disconnections of the client device from the access point device shorter than a first predetermined period; and
   determining that the client device is the unstable client device if the flap number is greater than a flap threshold.

16. The method according to claim 14, wherein performing the operation corresponding to the flap reason to stop flapping comprises one or more of the following:
   if the flap reason is active disconnecting by the access point device, determining a number of consecutive flap reasons being active disconnecting by the access point device, and stopping disconnecting the client device during a second predetermined period if the number of consecutive flap reasons being active disconnecting by the access point device is greater than an active disconnecting threshold;
   if the flap reason is background scanning by the client device, stopping steering the client device during a third predetermined period;
   if the flap reason is poor signals of the client device and the client device is an extender, sending a notification of poor signals of the extender;
   if the flap reason is the poor signal of the client device the client device is not the extender, increasing transmitting power of the access point device or moving the client device to a channel with a better signal; and
   if the flap reason is abnormality of the access point device, restarting the access point device.

17. The method according to claim 14,
   wherein determining the flap reason for the client device based on the disconnecting message comprises:
   determining that the disconnecting message indicates that the client device is disconnected from the access point device by the client device; and
   determining that uplink receiving signal strength at the access point device is greater than a receiving signal strength threshold for disconnecting.

18. A non-transitory computer-readable medium with instructions stored thereon which when executed by a processor of an access point device in a wireless fidelity (Wi-Fi) network cause the processor to perform the following:
   determining that a client device in the Wi-Fi network is an unstable client device based on repeated disconnection from the access point device;
   determining a flap reason for the client device based on a disconnecting message between the access point device and the client device;
   determining that the flap reason is background scanning by the client device if the client device is not an extender, and determining that the flap reason is abnormality of the access point device if the client device is the extender; and
   performing an operation corresponding to the flap reason to stop flapping.

19. The non-transitory computer-readable medium according to claim 18, wherein determining the unstable client device comprises:
   determining a flap number for the client device, the flap number indicating a number of time intervals between adjacent disconnections of the client device from the access point device shorter than a first predetermined period; and
   determining that the client device is the unstable client device if the flap number is greater than a flap threshold.

20. The non-transitory computer-readable medium according to claim 18, wherein performing the operation corresponding to the flap reason to stop flapping comprises one or more of the following:
   if the flap reason is active disconnecting by the access point device, determining a number of consecutive flap reasons being active disconnecting by the access point device, and stopping disconnecting the client device during a second predetermined period if the number of consecutive flap reasons being active disconnecting by the access point device is greater than an active disconnecting threshold;
   if the flap reason is background scanning by the client device, stopping steering the client device during a third predetermined period;
   if the flap reason is poor signals of the client device and the client device is an extender, sending a notification of poor signals of the extender;
   if the flap reason is the poor signal of the client device the client device is not the extender, increasing transmitting power of the access point device or moving the client device to a channel with a better signal; and if the flap reason is abnormality of the access point device, restarting the access point device.

\* \* \* \* \*